J. CLOVE.
TRAVELING THRESHING MACHINE.
APPLICATION FILED JAN. 22, 1920.
1,380,636.
Patented June 7, 1921.
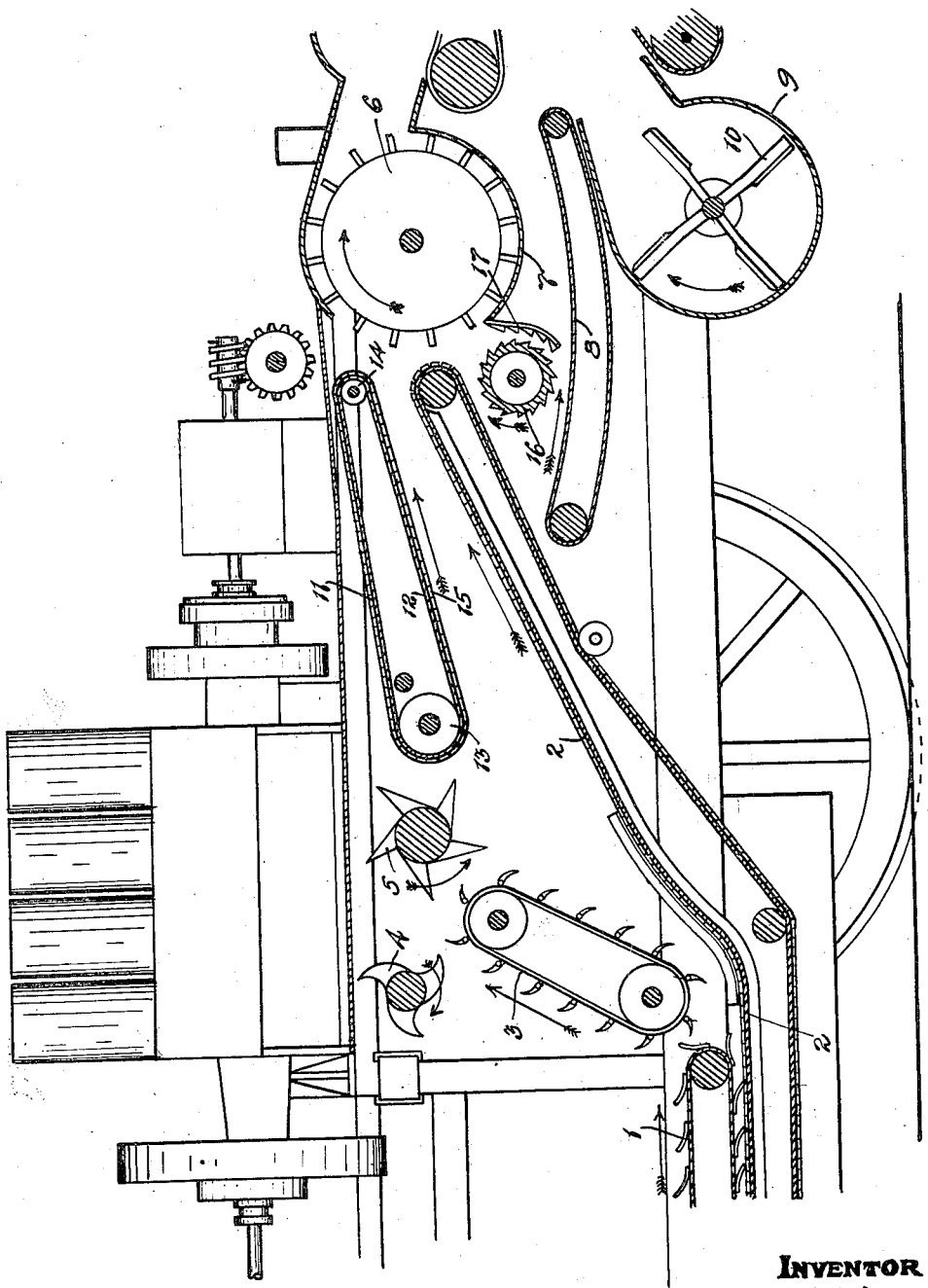
INVENTOR
BY
ATTYS

UNITED STATES PATENT OFFICE.

JACOB CLOVE, OF CALGARY, ALBERTA, CANADA.

TRAVELING THRESHING-MACHINE.

1,380,636.　　　　　Specification of Letters Patent.　　Patented June 7, 1921.

Application filed January 22, 1920. Serial No. 353,368.

*To all whom it may concern:*

Be it known that I, JACOB CLOVE, of the city of Calgary, in the Province of Alberta, Canada, have invented certain new and useful Improvements in Traveling Threshing-Machines, of which the following is the specification.

The invention relates to improvements in traveling threshing machines and particularly to an improvement in the internal and cleaning mechanisms of my previous machine, such being fully shown and described in my prior application No. 341443 filed the 29th of November, 1919, and the principal object of the invention is to provide a positive feed of the sheaves to the main cylinder and a feed which will not choke and further to improve the structure of the auxiliary cylinder and concave to avoid the cracking of the grain.

With the above more important objects in view the invention consists essentially in the arrangement and construction of parts hereinafter more particularly described and later pointed out in the appended claims, reference being had to the accompanying drawing in which:—

The figure is a vertical sectional view through the interior of a part of the traveling thresher containing the improvements.

In order to avoid a prolonged and unnecessary description I will initially refer to the older parts of the machine and without giving a detailed description of them, it being understood that in so far as the details of their structure and mode of operation are concerned they are the same as in the application referred to.

Referring to the drawing:—

Within the body of the machine there is located a horizontally disposed endless conveyer like feeder 1 positioned above an under feeder 2 having a horizontally disposed forward part and an upwardly and rearwardly inclining rear part and directly at the rear end of the feeder 1 and above the under feeder 2 is an upwardly inclined endless lifter 3. A combined cutter and retarder 4 is positioned somewhat above and directly in advance of the upper end of the lifter and a picker 5 is positioned slightly to the rear but above the upper end of the lifter. The rear end of the feeder 2 delivers to a main cylinder 6 which is associated with a main concave 7 and in a location beneath the main concave and the rear end of the under feeder is a horizontally disposed draper 8 and beneath this a fan casing 9 provided with an overshot cleaning fan 10. Means, not herein specified, are provided for driving the various devices, their direction of movement being indicated by the applied arrows.

In my above mentioned patent I have provided a beater in a location directly above the rear end of the under feeder and a retarder between the rear end of the under feeder and the main cylinder. These are dispensed with in the present construction and in their place I substitute an inclined top feeder 11 which comprises an endless belt 12 mounted on a front roller 13 and a rear roller 14, the belt being supplied with cross slats 15, and being driven in the direction indicated by the applied arrow.

Here it will be observed that the front or left hand end of the top feeder is just in advance of the picker 5 and considerably elevated from the under feeder, while the rear end is fairly close to the under feeder. Consequently the passage between the top feeder and the under feeder gradually decreases in height in passing rearwardly.

An auxiliary cylinder 16 is located directly beneath the rear end of the under feeder in the same position as shown in my prior application but it is driven to rotate in the opposite or a clockwise direction and is provided with ratchet like cross teeth as shown. The auxiliary cylinder concave 17 is positioned directly to the rear of the auxiliary cylinder and has the teeth thereof constructed in the manner shown.

As will be apparent the top feeder and the construction and arrangement of the auxiliary cylinder and auxiliary concave are the new features in this application.

When the machine is operating the sheaves fed rearwardly by the under feeder are positively prevented from clogging at the discharge end by the action of the top feeder which provides in conjunction with the under feeder a forced feed for the sheaves through the gradually decreasing passage provided between said top and bottom feeder.

The auxiliary cylinder which is rotated at a considerably lower speed than the main cylinder threshes in conjunction with the auxiliary concave, the shattered material falling from the rear end of the under feeder and delivers this on to the draper 8. This auxiliary cylinder and concave relieves the main cylinder of a considerable load as all the falling small material is taken by it and threshed and as the said auxiliary cylinder is rotated at a comparatively low speed the grain passing through it, while being freed from the head is not shattered, as it would be in all probability, if passed through the main cylinder rotating at a comparatively high speed.

With these improvements this part of the machine is much more efficient, the feed to the cylinders being positive at all times and the load being divided between the cylinders, the main cylinder taking the longer material and the auxiliary cylinder the shattered material.

What I claim as my invention is:—

1. In a threshing machine, the combination with a main cylinder and concave and feeding means for delivering material to be threshed to the cylinder, of an auxiliary cylinder and concave positioned adjacent the main cylinder and designed to receive and thresh the shattered material escaping downwardly between the feeding means and the main cylinder.

2. In a threshing machine, the combination with a main cylinder and concave and feeding means for delivering material to be threshed to the cylinder, of an auxiliary cylinder and concave positioned adjacent the main cylinder and with the auxiliary cylinder rotating at a lower speed than the main cylinder and designed to receive and thresh the shattered material escaping downwardly between the feeding means and the main cylinder.

3. In a threshing machine, the combination with a main cylinder and concave and feeding means for delivering material to be threshed to the cylinder, of an auxiliary cylinder and concave positioned adjacent the main cylinder and rotated at a lower speed and in the same direction as the main cylinder and designed to receive and thresh the shattered material escaping downwardly between the feeding means and the main cylinder.

4. In a threshing machine, the combination with a main cylinder and concave and a feeder delivering material to the main cylinder at the side, of an auxiliary cylinder and concave positioned beneath the delivery end of the feeder and adapted to receive and thresh the material escaping downwardly between the feeder and the main cylinder.

5. In a threshing machine, the combination with a main cylinder and concave and a feeder delivering material to the main cylinder at the side, of an auxiliary cylinder and concave located beneath the delivery end of the feeder and designed to receive the shattered material dropping down from the feeder, the said auxiliary cylinder being rotated in the same direction as the main cylinder and at a lower speed.

Signed at Winnipeg, this 16th day of December, 1919.

JACOB CLOVE

In the presence of—
G. S. ROXBURGH,
R. BLASDALE.